UNITED STATES PATENT OFFICE.

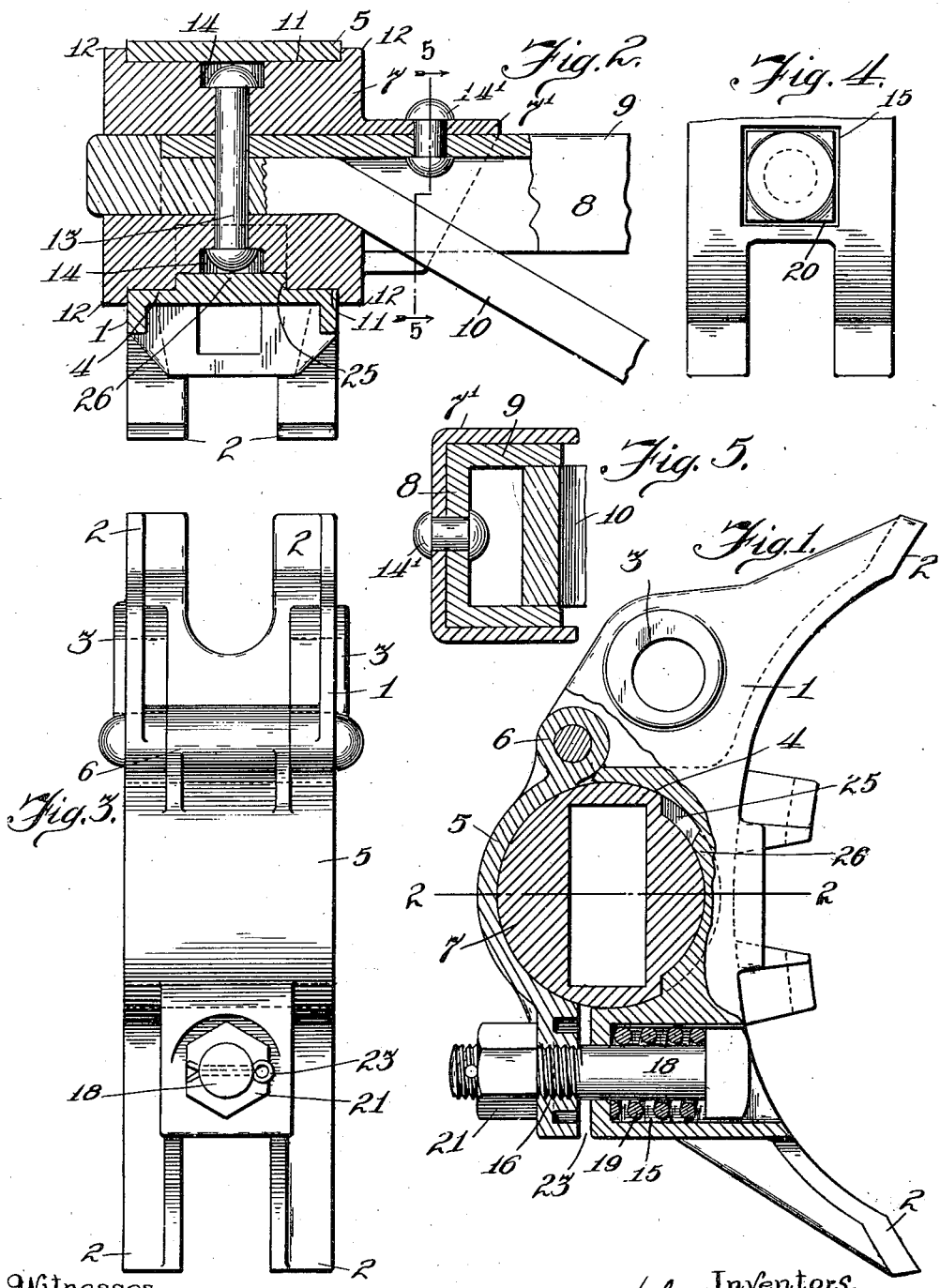

HUBERT M. PERRY AND CHARLES F. HUNTOON, OF CHICAGO, ILLINOIS.

BRAKE-HEAD.

1,022,440.  Specification of Letters Patent.  Patented Apr. 9, 1912.

Application filed February 26, 1909. Serial No. 480,164.

*To all whom it may concern:*

Be it known that we, HUBERT M. PERRY and CHARLES F. HUNTOON, citizens of the United States, residing in the city of Chicago, county of Cook, and State of Illinois, respectively, have invented certain new and useful Improvements in Brake-Heads, of which the following is a specification.

This invention relates to improvements in brake heads and refers more particularly to a brake head of that type having angular adjustment whereby the brake shoe may always conform to the tread of the wheel regardless of changes in the position of the brake beam relative to the latter.

Among the salient objects of the invention are to provide an adjustable brake head, the beam-embracing member of which is of two-part construction in order that it may be more readily assembled upon the bearing sleeve of the beam; to provide a brake head which after it is mounted in position will so adjust itself that the brake shoe will conform to the tread of the wheel whenever the angular relation between the beam and the latter changes, and when so adjusted will remain automatically locked in said position; to provide in a brake head of the above character novel means for automatically locking the brake head in whatever position it may assume and at the same time automatically taking up any slack or looseness between the bearing parts due to wear or otherwise; to provide novel means for positively limiting the angular adjustment of the brake head; to provide improvements in the details of construction of the bearing sleeve whereby lateral displacement of the head is positively prevented, independently of special fastenings, such as confining bolts, cotter pins, and the like; to provide a brake head which can be used with various types of beams without necessitating revising the construction of the former; and in general to provide an improved brake head of the character referred to.

In the drawings Figure 1 designates a side elevation of our brake head, shown in position upon the trussed beam, parts being broken away and shown in section to bring out details of construction. Fig. 2 is a transverse sectional view, taken on lines 2—2 of Fig. 1. Fig. 3 is a rear edge elevation of the parts shown in Fig. 1. Fig. 4 is a fragmentary front elevation of the brake head, showing more particularly the shape of the socket which receives the locking bolt. Fig. 5 is a sectional detail taken through the indirect line 5—5 of Fig. 2.

Referring to the drawings, 1 designates as a whole our improved brake head and having the usual brake shoe supports 2, and hanger-bolt apertures 3 for the brake link. As an important feature of our invention the bearing member 4 of the head is of two part construction, a movable segment 5 being pivoted or hinged as shown at 6 to the main body of the head. The brake head is mounted upon a bearing sleeve 7 secured to the end of a trussed beam 8, which comprises the usual compression member 9 and tension member 10.

In constructions heretofore used, the brake head has often been confined against lateral displacement from the beam by means of special fastenings, such as confining bolts, cotter pins, and the like, or by increasing the frictional engagement between the head and the bearing sleeve. To avoid this we provide a bearing sleeve having a circumferential groove 11 formed between a pair of shoulders or ribs 12 extending around the respective ends of the bearing sleeve 7. It will be noted that the groove is of substantially the same width as the brake head in order that the latter may be closely confined and secured in position. The bearing sleeve is fixed to the end of the beam by means of a through bolt or rivet 13, the ends of which are counter sunk in the face of the sleeve as shown at 14. In order to strengthen the bearing sleeve and remove part of the strain upon the bolt 13 the sleeve is provided with a reduced extension 7' which is secured to the compression member by means of a rivet 14'. It may also be noted that the fact that the bearing ring 4 of the brake head is of two part construction enables it to be assembled upon a bearing sleeve of the above character.

Describing now the manner of locking the head in position upon the bearing sleeve, the main body of the former is provided with a bolt-socket 15 to receive a locking bolt 18 and a coiled spring 19. The threaded end of the bolt 18 extends through a corresponding aperture 16 in an ear like extension of the segment 5. The entrance end of the socket 15 is squared, as shown at 20, in order that the head of the bolt may be confined against turning when the nut 21 is threaded on the opposite end of the bolt. The spring 19 acts on bolt 18 to withdraw the movable segment of the bearing ring toward the main body of the head, and the nut 21 is held from working loose by means of a split cotter pin 23 extending through the outer end of the bolt 18 as shown.

The effect of the above construction is such that after the parts have been yieldably locked together by the bolt 18 but spaced apart as shown at 23, they are constantly under the tension of the coiled spring 19, so that while the brake head is free to shift angularly through the action of the wheel upon the shoe, the spring 19 will automatically lock the head in its adjusted position.

Describing now the manner of positively limiting the angular adjustment of the brake head, which forms one feature of our invention, upon the forward inner face of the bearing surface 4 of the head is formed an integral segmental tongue or rib 26 which is adapted to enter a similarly formed groove 25 in the opposite bearing surface of the sleeve 7. This groove 25 is of substantially greater length than the rib 26, in order that the head may have considerable angular movement relative to the sleeve. If desired, the relations of the tongue and groove may be reversed in a well understood manner.

While we have herein shown a preferred construction, it is of course apparent that it may be more or less varied without in any manner departing from the spirit of the invention.

We claim as our invention:

1. The combination with a brake beam, of a bearing sleeve mounted on said brake beam and provided at either side with an annular shoulder, an adjustable brake head comprising a body portion and a segmental clamping member pivotally connected to the body portion, said body portion and clamping member fitting closely around the bearing sleeve between the shoulders, the opposed bearing surface of said sleeve being smooth, a socket member formed in the lower end of the body portion of said head such socket member being square in cross section, open at the front end and closed at its rear end, an opposed socket member formed in the lower end of said pivoted clamping member, a bolt extending through the socket members having its squared head seated in the open end of the first mentioned socket member, a nut screwed to the threaded end of the bolt and a coiled expansion spring seated in said first mentioned socket member and engaging the closed end of said socket member and head of the bolt to draw the two parts of the head together.

2. The combination with a brake beam, of a bearing sleeve mounted on said brake beam, a bolt for securing the sleeve to the beam, the ends of said bolt being countersunk in suitable recesses formed in said sleeve, an annular shoulder at either side of the sleeve, a two-part brake head adjustably mounted in said sleeve between said annular shoulders, said brake head comprising a main body portion, and a segmental clamping member pivotally connected to the main body portion, a segmental tongue integrally connected to the bearing surface of the head and adapted to enter a similarly formed groove in the opposed bearing surface of the sleeve, said groove being of greater length than the tongue to permit limited movement of the head in the sleeve and means for clamping the head to the sleeve, comprising a socket member formed in the lower end of said main body portion open at its front end and closed at its rear end and polygonal in cross section, an opposed socket member carried by the lower part of said clamping member, a bolt extending through said socket members, the head of said bolt being polygonal in cross section, a nut threaded on the projecting end of the bolt and a coiled expansion spring seated in the socket member of the body portion between the closed inner end of the latter and the head of the bolt.

HUBERT M. PERRY.
CHARLES F. HUNTOON.

Witnesses:
   LOIS FORCE,
   F. L. BELKNAP.